United States Patent
Winston et al.

(10) Patent No.: US 11,814,611 B2
(45) Date of Patent: Nov. 14, 2023

(54) SLUSH

(75) Inventors: Scott Winston, Welwyn Garden City (GB); Harry Levine, Morris Plaines, NJ (US); Louise Slade, Morris Plaines, NJ (US); Dennis Brooks, Westport, CT (US)

(73) Assignee: Diageo Great Britain Ltd.

( * ) Notice: Subject to any disclaimer, the term of this patent is extended or adjusted under 35 U.S.C. 154(b) by 2370 days.

(21) Appl. No.: 13/379,105

(22) PCT Filed: Jun. 15, 2010

(86) PCT No.: PCT/GB2010/050994
§ 371 (c)(1),
(2), (4) Date: Mar. 7, 2013

(87) PCT Pub. No.: WO2010/146392
PCT Pub. Date: Dec. 23, 2010

(65) Prior Publication Data
US 2013/0196044 A1    Aug. 1, 2013

(51) Int. Cl.
| | | |
|---|---|---|
| *C12G 3/00* | (2019.01) | |
| *C12G 3/06* | (2006.01) | |
| *A23G 9/04* | (2006.01) | |
| *B65D 1/02* | (2006.01) | |

(52) U.S. Cl.
CPC ............. *C12G 3/00* (2013.01); *A23G 9/045* (2013.01); *B65D 1/0223* (2013.01); *C12G 3/06* (2013.01)

(58) Field of Classification Search
None
See application file for complete search history.

(56) References Cited

U.S. PATENT DOCUMENTS

| | | | |
|---|---|---|---|
| 4,790,999 A | | 12/1988 | Ashmont et al. |
| 5,239,819 A | * | 8/1993 | Kinneberg ............. C09K 5/063 252/70 |
| 5,296,251 A | | 3/1994 | Ishida et al. |
| 5,853,785 A | * | 12/1998 | Nayyar ..................... A23F 5/40 426/565 |
| 2001/0041210 A1 | * | 11/2001 | Kauffeld ................ A23G 9/045 426/590 |

(Continued)

FOREIGN PATENT DOCUMENTS

| | | |
|---|---|---|
| CN | 1169469 | 1/1998 |
| EP | 0268097 | 5/1988 |

(Continued)

OTHER PUBLICATIONS

International Search Report for PCT/GB2010/050994, dated Oct. 20, 2010.

(Continued)

*Primary Examiner* — Elizabeth Gwartney
(74) *Attorney, Agent, or Firm* — Scherrer Patent & Trademark Law, P.C.; Stephen T. Scherrer; Monique A. Morneault

(57) ABSTRACT

A slush beverage formulation and method for preparing same that, once reaching a steady-state temperature in a freezer, results in a pourable slush. The pourable slush is obtained by formulating to a specific range of ingredient content, dependent on the alcohol content of the end product. In a preferred form, an ice-nucleating agent and/or an ice-particle-shape-controlling ingredient are added.

19 Claims, 2 Drawing Sheets

(56) References Cited

U.S. PATENT DOCUMENTS

| | | |
|---|---|---|
| 2003/0219517 A1 | 11/2003 | Purcell |
| 2004/0219265 A1 | 4/2004 | Binley et al. |
| 2008/0085342 A1 | 10/2008 | Binley et al. |

FOREIGN PATENT DOCUMENTS

| | | |
|---|---|---|
| EP | 0941668 | 9/1999 |
| GB | 1331518 | 9/1973 |
| GB | 2251863 | 7/1992 |
| JP | S62-285773 | 11/1987 |
| JP | H06-019500 | 3/1994 |
| JP | 2100665 | 4/1996 |
| JP | 11 032689 | 2/1999 |
| JP | 2005-328751 | 12/2005 |
| JP | 2007-269407 | 10/2007 |
| JP | 2008-296920 | 12/2008 |
| WO | 9220420 | 11/1992 |
| WO | 9611578 | 4/1996 |
| WO | WO 96/11578 | 4/1996 |
| WO | 9637120 | 11/1996 |
| WO | WO 2006/007921 | 1/2006 |
| WO | WO2006/109200 | 10/2006 |

OTHER PUBLICATIONS

International Preliminary Report on Patentability for PCT/GB2010/050994, dated May 12, 2011.

\* cited by examiner

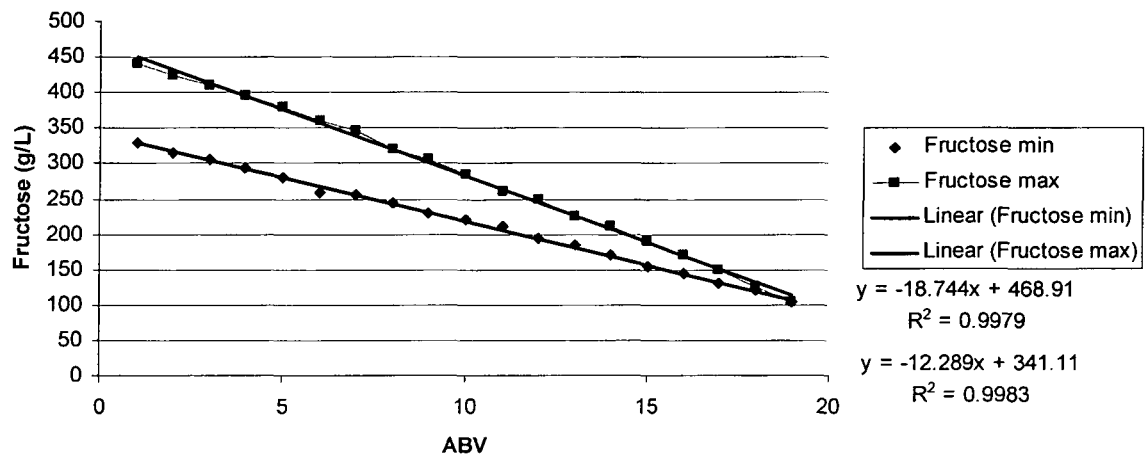
Fig. 1. Fructose v ABV (9 Celsius degree window)
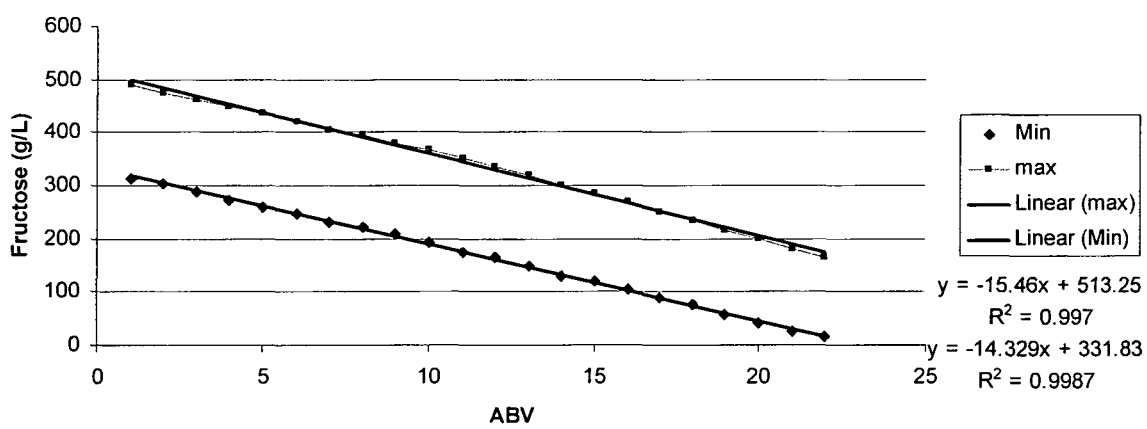
Fig. 2. Fructose v ABV (5 Celsius degree window)

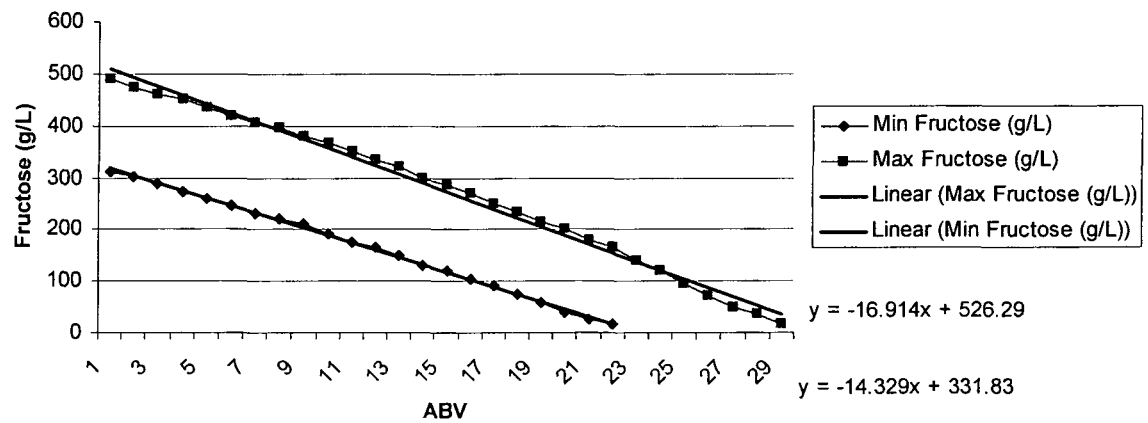
Fig. 3. Fructose Loading v ABV (5 Celsius degree window) – extended ABV
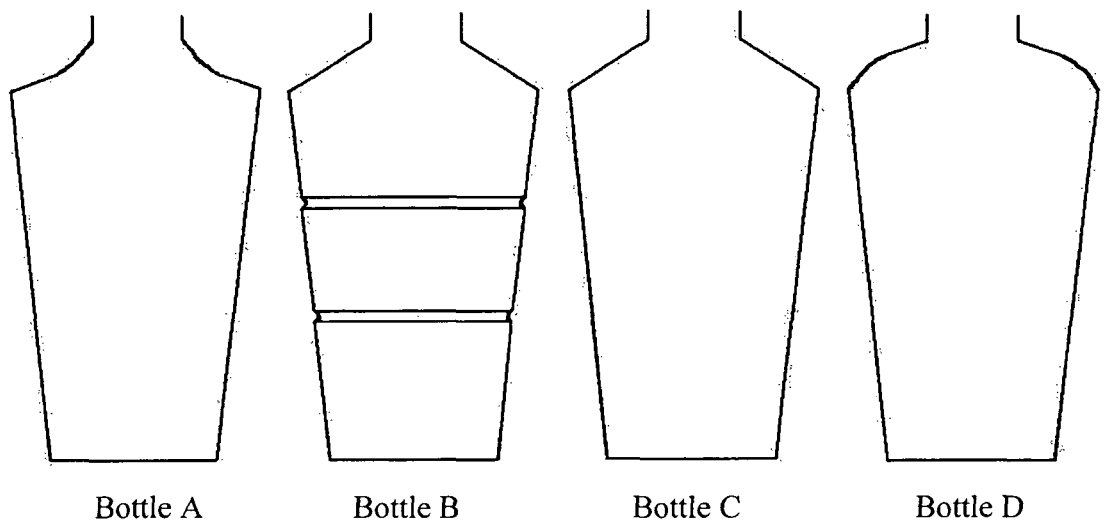
Fig. 4.

SLUSH

The present disclosure claims priority to PCT Patent Application No. PCT/GB2010/050994, filed Jun. 15, 2010, and GB Patent Application Nos. 0910624.6, filed Jun. 19, 2009, and 0922152.4, filed Dec. 18, 2009, each of which is incorporated herein by reference in its entirety.

TECHNICAL FIELD

The present invention relates to slush, primarily edible beverage slush, formed by freezing such as might be experienced in a domestic freezer.

The product formulation technology described herein allows the creation of beverages that, even when distributed and sold at ambient temperatures, can be placed in a home freezer to become frozen slush beverage products that maintain the characteristic of being a dispensable, i.e. pourable, slush.

BACKGROUND ART

The frozen beverage market is a global market, with frozen soft drinks and cocktails being popular choices of drink across many markets. Preparation of such frozen beverages can be quite tedious, requiring the use of equipment such as scrape-surface slush machines (e.g. Slush Puppy™) to produce small ice crystals or a blender to reduce ice cubes to small ice particles. This equipment is inconvenient and often avoided by consumers. Several products have been marketed to address convenience, with the ability to freeze in a static domestic freezer and deliver a soft-ice. However, all of these products have suffered from the variation in domestic freezer temperatures. These products fail in the warmer domestic freezers, due to failure to form ice, or to formation of insufficient amounts of ice, resulting in a cold beverage with a small amount of floating ice particles. They also fail in the colder freezers, due to over-hardening, which can occur in as little time as leaving the products in the freezer overnight, thus requiring a thaw step prior to dispensing. This could involve waiting for the product to partially melt, or inducing such melting through adding heat by microwave treatment or manipulation by hand, e.g. as described in U.S. Pat. No. 5,853,785.

WO96/11578 refers to an improvement in the form of an alcoholic soft-ice; however, the product described is not freely pourable and must be removed from the container by a hand-operated utensil, such as a spoon, whereas an ideal frozen beverage should be easily pourable. Prior to this, EP0268097 reported a similar spoonable, not pourable, frozen product. Prior-art frozen soft-ice formulations use stabilisers and gums (e.g. CMCs), which can impede pourability and can have a negative organoleptic effect on frozen beverages.

Even if products perform after adding heat, they are frequently judged as failures by consumers who expect the convenience of a ready-to-consume, pourable, frozen cocktail. The failure rate of such products can be as high as 40-50%, resulting in ultimate consumer rejection of such products. Thus a clear opportunity exists for a ready-to-serve slush beverage that is pourable after freezing from a wide range of domestic freezer temperatures.

To be a success, a quiescently frozen slush must both deliver on the promise of convenience and provide acceptable product performance to the widest possible consumer audience. This means a commercially attractive product must have characteristic and desired properties in a range of freezer temperatures.

Nearly all freezers (and specifically, US domestic freezers) operate within a working range of −11 to −20° C. Depending on the market, most (i.e. a substantial proportion of) freezers may operate in a more limited 5 Celsius degree range between −11 and −20° C. In order to produce a product that is acceptable to consumers, that product must perform in a substantial number of freezers within the market (and therefore, over a continuous range of temperatures). Most preferably, that range would be the full 9 Celsius degrees; however, for the purpose of a particular market, it may be acceptable if a product can perform in a more limited five degree range, within the broader range from −11 to −20° C., for that market.

The above restrictions have implications on the performance of a commercially viable frozen product. The challenge of supplying a commercially attractive product becomes more pronounced, when the product supplied to the consumer will not start off in its final consumption state, i.e. supplied at ambient temperature, but then quiescently frozen by the consumer. As described, domestic freezers represent a varied environment that is beyond the control of a beverage product developer.

BRIEF DESCRIPTION OF THE SEVERAL VIEWS OF THE DRAWINGS

FIG. 1 is a graphical plot showing the linear relationship of required Fructose loading (g/L) to Alcohol By Volume (ABV) in order to achieve a pourable slush.

FIG. 2 is a graphical plot showing the linear relationship of required Fructose loading (g/L) to Alcohol By Volume (ABV) in order to achieve a pourable slush across a 5 Celsius degrees range according to the invention.

FIG. 3 is a comparable graphical plot to FIG. 2, showing an extended ABV range.

FIG. 4 illustrates a series of beverage bottle profiles suitable for containing and dispensing a pourable slush according to the invention.

DISCLOSURE OF THE INVENTION

The invention presents a formulation for a pourable slush beverage that will meet an acceptance standard in the majority of domestic freezers and is ready for consumption, once it has frozen and reached a steady-state temperature. It should remain in a pourable/flowable state for an extended period of many months in a freezer, and generally be able to be thawed and "re-set" after purchase, should the ice crystals become undesirably large.

In a broad aspect of the invention, there is provided an alcoholic beverage formulation that forms a pourable slush across a range of at least five Celsius degrees between −11 and −20° C., that comprises:

a total ingredient content for a given ABV (Alcohol By Volume) within a range calculated from the equations:

minimum total ingredient content (g/L)=(−14.3×ABV)+331.8 maximum total ingredient content (g/L)=(−15.5×ABV)+513.3 where ingredients in g/L, accumulate to contribute to the total ingredient content but are first divided by a value F dependent on the ingredient, the ingredients being selected from the group consisting of:

| Ingredient | F |
| --- | --- |
| Fructose | 1.0 |
| Glucose | 1.2 |
| Sucrose | 1.4 |
| Acid (e.g. citric or malic) | 2.0 |
| Emulsion | 2.2 |
| Gelatin Hydrolysate | 1.8 |
| Propylene Glycol | 1.25 |
| Betaine | 0.67 |
| Trehalose | 1.43 |
| Erythritol | 1.43 |
| Sorbitol | 1.43 |
| Isomaltulose | 2.0 |
| Glycerol | 1.25 |
| Maltodextrin | 2.86 |

An alternate expression of the invention is to provide a table of reciprocal values from the above table wherein, for every 1 g of actual ingredient, the amount contributing to the total ingredient content is given by given by the equations:

| Ingredient | 1/F |
| --- | --- |
| Fructose | 1.0 |
| Glucose | 0.83 |
| Sucrose | 0.71 |
| Acid (e.g. citric or malic) | 0.50 |
| Emulsion | 0.45 |
| Gelatin Hydrolysate | 0.56 |
| Propylene Glycol | 0.80 |
| Betaine | 1.49 |
| Trehalose | 0.70 |
| Erythritol | 0.70 |
| Sorbitol | 0.70 |
| Isomaltulose | 0.50 |
| Glycerol | 0.80 |
| Maltodextrin | 0.35 |

Any further, unlisted, ingredients could be added to a formulation according to the invention, but would not contribute to the ingredient content calculation.

The slush product is most typically made using a domestic freezer, but can be produced in any appropriate cooling apparatus.

It was discovered that different ingredients have different effects on slush pourability. Therefore, if a given ingredient is substituted for another ingredient, the other ingredients may need adjustment to achieve the same degree of slush pourability. The extent of adjustment depends on the specific ingredient. To simplify application of the invention, it was decided to use fructose as a base unit, to which all other ingredients are compared. Once an equivalent ratio for a particular ingredient is established it is possible to determine the "fructose equivalent loading" as defined by the equation. However, it would also be possible to use another base unit (or an arbitrary unit) and assign values for different ingredients.

The same modifying principles apply to the addition of food acids such as citric, malic and tartaric acids to a slush formulation.

The invention involves adding a prescribed amount of fructose (or other ingredient), dependent on alcohol content, that will allow formulation of a slush beverage that will remain pourable in a domestic freezer. Since, in practice, there is variation in the average operating temperatures of domestic freezers in a given market, the formulation must produce a pourable slush, after it reaches a steady-state temperature within at least a continuous five Celsius degrees of a freezer temperature range between −11 and −20° C.

Most preferably, the formulation will have pourability characteristics over the entire −11 to −20° C. range (i.e. a nine Celsius degree window).

The formulation of the invention produces an ice content, such that the product, once frozen at a steady-state temperature, is a pourable slush.

Optionally, an ice-nucleating agent may be added. While an ice-nucleating agent is not an essential ingredient, in practice an ice nucleator is desirable, because the melting temperature of the formulation may be close to the warmest freezer temperature, and assuming some degree of supercooling could occur, the presence of an ice nucleator further ensures ice formation, as the beverage reaches a steady-state temperature in a domestic freezer.

An ice-nucleating agent is defined herein as an additive/ingredient present in the solution, or in contact with the solution, which serves the purpose of reducing the effect of supercooling by causing ice crystal formation, when the solution is at any temperature between (below) the melting point and (above) the homogeneous nucleation temperature of that solution.

Preferably, the ice-nucleating agent is stigmasterol.

As a further option, dependent on the desired mouthfeel of the product, an ice-crystal-morphology-modifying ingredient may be added. A preferred ingredient to achieve this aspect is gelatin hydrolysate of average molecular weight in the range 3000 Da to 15000 Da.

Accordingly, in a further aspect, the present invention also provides a method of formulating an alcoholic beverage for forming a pourable slush using a freezer with a temperature range of between −11 to −20° C., including the steps of:

adding at least a minimum amount of fructose dependent on alcohol content (ABV) according to the equation:

$$\text{minimum fructose (g/L)} = (-14.3 \times \text{ABV}) + 331.8;$$

optionally substituting an amount of fructose with an amount of another ingredient(s) that has an equivalent effect on slush pourability at the ABV.

Substitution of fructose by other ingredients can be performed by observing the effect on slush pourability of the addition of a given quantity of an ingredient at a given ABV and then relating this to the amount of fructose that achieves the same effect.

However, in alternative embodiments, the substitution step could be performed by comparison to sucrose or glucose as the reference ingredient. This would require an alternative equation.

In practice substitution involves determining permanent ratios for ingredients compared to fructose so that the contribution of any ingredient for obtaining a pourable slush can be calculated.

The product of the invention forms a flowable/pourable slush over at least a continuous range of 5 Celsius degrees between −11 and −20° C. Such a slush is also pumpable in a dynamic system. A "pourable slush" is defined by the following characteristics:

To be "pourable" a slush should have no less than 100 g/L and no more than 350 g/L ice content as will be discussed in more detail below. The slush, after forming in a (preferably flexible) plastic bottle, can be easily squeezed and have a few shakes applied to break the brittle ice structure that forms therein. Then the bottle can be inverted into a glass, and with minor agitation, the slush can be poured into a glass. At its thickest consistency, the slush may require a few extra squeezes to remove it from the bottle (<10% of the slush should remain in the bottle). A spoon is not required to remove the product from its container.

A key advantage of the invention can be described as providing a formulation that conveniently takes the uncertainty out of preparing a pourable frozen beverage and is ready to use straight out of the freezer. The formulation ensures reliable and consistent reproducibility of the frozen beverage, and offers that within a format that is simple for the consumer to prepare, i.e. placing a bottle of the product into any of the broad range of domestic freezer temperatures. Once frozen, the product is ready to consume, removing the need and mess of a blender, or the need for specific ingredient knowledge required to make a perfect frozen cocktail (or similar beverage), or the need for a thaw step after removing it from the freezer. With a minor agitation (i.e. a squeeze and a shake to loosen the statically formed ice structure), the product can be consumed, directly from the bottle or after being dispensed, as a frozen beverage.

The product can be prepared well in advance of required usage, and the pourability of the slush remains as consistent as the temperature of the freezer it is stored within. The product, in terms of ease of pourability, will retain its characteristics for several years. However, if stored for an excessive time period (several months) the ice crystals in the frozen product accrete, i.e. a noticeable increase in the average ice crystal size occurs, which leads to a change in the ideal frozen-mouthfeel texture. However, a thaw and refreeze resets the product with its original desired crystal size. The formulations benefit from being able to be served from a semi-rigid bottle, giving the impression of being a beverage unlike other 'pouch' products on the market, which can appear cheap and undesirable to consumers who wish to feel they have purchased a premium-quality branded cocktail.

Previous inventions in this field have failed. E.g., WO 96/11578 describes changing the alcoholic content of a spoonable slushy product, in order to have significant impact on freezing. Thus, WO 96/11578 describes a spoonable alcoholic soft-ice with either low alcohol content, producing a product that becomes too rigid to be pourable, or with a higher-alcohol-content, producing a product that would not freeze or would only freeze in a small percentage of the domestic-market freezers.

It should be noted that the invention described herein refers to the liquid-formulation ("slush") product, both before and after quiescent freezing. Whilst this product is suitable to be distributed in a frozen state, for ease of distribution, the product is preferably distributed at ambient temperature (unfrozen), and forms a slush after placement in a domestic freezer, at any time prior to consumption. The "pre-slush" product at ambient temperature will contain no ice, as it is above the melting temperature of the formulation, and will be free-flowing. Clearly, the scope of the invention covers this "pre-slush" product, regardless of its temperature/state.

MODE(S) FOR CARRYING OUT THE INVENTION

In order to determine the range of ingredients suitable for use in carrying out the invention, it was necessary to establish the limits at which the slush beverage could remain pourable, once at a steady-state temperature corresponding to the boundaries of the preferred freezer temperature range, i.e. −11 and −20° C.

Ranges of ingredients had to be determined based on what has been defined as a pourable slush; any level of ice content falling outside that definition would be too thin/watery or too thick, the latter becoming unpourable/spoonable.

It was surprising to find that, for a given slush consistency, the relationship between ingredient and alcohol content is approximately linear.

General observations made during the course of experimental formulation were as follows:

- If too much total ingredient (based on fructose equivalence) is added at a given ABV, then at the warmer end of the range (−11° C.) the beverage either will not form ice or will not form enough ice (i.e. it will be too 'thin') to be considered a pourable slush.
- If too little total ingredient is added (based on fructose equivalence), then at the colder end of the range (−20° C.) the beverage will form too much ice (i.e. it will be too 'thick') to be a pourable slush.
- As alcohol concentration increases, a lesser amount of total ingredients (based on fructose equivalence) are needed to make a pourable slush.

Example 1

It was found, at a specific ABV, that particular minimum and maximum amounts of fructose resulted in pourable slushes, as indicated in Table 1-1.

TABLE 1-1

| | ABV | Min g/L fructose added to achieve pourable slush at −20° C. | Max g/L fructose added to achieve pourable slush at −11° C. |
|---|---|---|---|
| 1 Fructose | 1 | 330 | 440 |
| 2 Fructose | 2 | 315 | 425 |
| 3 Fructose | 3 | 305 | 410 |
| 4 Fructose | 4 | 293 | 395 |
| 5 Fructose | 5 | 280 | 380 |
| 6 Fructose | 6 | 258 | 360 |
| 7 Fructose | 7 | 255 | 345 |
| 8 Fructose | 8 | 245 | 320 |
| 9 Fructose | 9 | 230 | 305 |
| 10 Fructose | 10 | 220 | 285 |
| 11 Fructose | 11 | 210 | 260 |
| 12 Fructose | 12 | 195 | 248 |
| 13 Fructose | 13 | 185 | 225 |
| 14 Fructose | 14 | 170 | 210 |
| 15 Fructose | 15 | 155 | 190 |
| 16 Fructose | 16 | 145 | 170 |
| 17 Fructose | 17 | 130 | 150 |
| 18 Fructose | 18 | 120 | 125 |
| 19 Fructose | 19 | 105 | 105 |

The slush product, made with a fructose content as defined in Table 1-1, is pourable across the entire temperature range from −11 to −20° C.

Therefore, according to the data in Table 1-1, the range of fructose contents needed to be added to, for example, a 9% ABV beverage formulation is 230 to 305 g/L, to result in a beverage with a minimum amount of ice to be considered an acceptable slush, but not so much ice as to be unpourable. Using less than 230 g/L fructose will result in a beverage that is too thick to be considered pourable in the coldest freezers (−20° C.) and using more than 305 g/L fructose will result in a beverage that does not form sufficient ice to be considered a slush in warmest freezers 11° C.)

The values in Table 1-1 can be plotted, as shown in FIG. 1. In this Figure, linear relationships can be seen, which enable numerical formulas to be generated for predicting required fructose upper- and lower-range content values for a given ABV.

Lower-range ingredient loading (fructose) g/L:

$$y = -12.3x + 341.1$$

Upper-range ingredient loading (fructose) g/L:

$$y = -18.7x + 468.9$$

Where −12.3 and −18.7 are the respective graph gradients, 341.1 and 468.9 are the respective theoretical zero-intercept points with the y axis, x is the ABV value, and y is the amount of fructose to be used to achieve a pourable slush (at that ABV). For completeness, the R-squared values for the respective equations are 0.9983 and 0.9979.

Using these formulas, one can calculate the desired fructose content range for any % ABV formula. For example, for 7.8% ABV:

$$(-12.3 \times 7.8) + 341.1 = 245.3 \text{ g/L fructose (lower content)}$$

$$(-18.7 \times 7.8) + 468.9 = 322.7 \text{ g/L fructose (upper content)}$$

Comparing these results with the data in Table 1-1 for 8% ABV reveals fairly good agreement.

It should be noted that an ABV of 19 represents a practical limit for formulations to achieve a pourable slush at the most desirable nine Celsius degrees operating window. At higher ABVs, it is not possible to produce a beverage that forms a pourable slush over the full nine Celsius degree range between −11 and −20° C. For example, at 20 ABV, a beverage cannot form enough ice to be considered a slush at −11° C. However, if a narrower operating temperature window were acceptable, then higher ABV beverages could be formulated.

It is sufficient, and still commercially useful, to determine ingredient content ranges coinciding with a continuous 5 Celsius degree temperature range between −11 and −20° C. To do this it is necessary to look at the two five Celsius degree ranges at the limits of the broader −11 to −20° C. range, i.e. −11 to −16° C. and −15 to −20° C. The dataset for this expanded range (a five Celsius degree range is a less strict condition than a nine Celsius degree range) is provided in Tables 1-2A and 1-2B below.

TABLE 1-2A

| | | ABV | Min g/L fructose added to achieve pourable slush over a range of −11 to −16° C. | Max g/L fructose added to achieve pourable slush over a range of −11 to −16° C. |
|---|---|---|---|---|
| 1 | Fructose | 1 | 312 | 440 |
| 2 | Fructose | 2 | 302 | 425 |
| 3 | Fructose | 3 | 288 | 410 |
| 4 | Fructose | 4 | 272 | 395 |
| 5 | Fructose | 5 | 258 | 380 |
| 6 | Fructose | 6 | 245 | 360 |
| 7 | Fructose | 7 | 230 | 345 |
| 8 | Fructose | 8 | 220 | 320 |
| 9 | Fructose | 9 | 210 | 305 |
| 10 | Fructose | 10 | 192 | 285 |
| 11 | Fructose | 11 | 175 | 260 |
| 12 | Fructose | 12 | 165 | 248 |
| 13 | Fructose | 13 | 148 | 225 |
| 14 | Fructose | 14 | 130 | 210 |
| 15 | Fructose | 15 | 120 | 190 |
| 16 | Fructose | 16 | 105 | 170 |
| 17 | Fructose | 17 | 90 | 150 |
| 18 | Fructose | 18 | 75 | 125 |
| 19 | Fructose | 19 | 58 | 105 |
| 20 | Fructose | 20 | 40 | 80 |
| 21 | Fructose | 21 | 25 | 60 |
| 22 | Fructose | 22 | 15 | 35 |

TABLE 1-2B

| | | ABV | Min g/L fructose added to achieve pourable slush over a range of −15 to −20° C. | Max g/L fructose added to achieve pourable slush over a range of −15 to −20° C. |
|---|---|---|---|---|
| 1 | Fructose | 1 | 330 | 490 |
| 2 | Fructose | 2 | 315 | 475 |
| 3 | Fructose | 3 | 305 | 460 |
| 4 | Fructose | 4 | 293 | 450 |
| 5 | Fructose | 5 | 280 | 435 |
| 6 | Fructose | 6 | 258 | 420 |
| 7 | Fructose | 7 | 255 | 405 |
| 8 | Fructose | 8 | 245 | 395 |
| 9 | Fructose | 9 | 230 | 380 |
| 10 | Fructose | 10 | 220 | 365 |
| 11 | Fructose | 11 | 210 | 350 |
| 12 | Fructose | 12 | 195 | 335 |
| 13 | Fructose | 13 | 185 | 320 |
| 14 | Fructose | 14 | 170 | 300 |
| 15 | Fructose | 15 | 155 | 285 |
| 16 | Fructose | 16 | 145 | 270 |
| 17 | Fructose | 17 | 130 | 250 |
| 18 | Fructose | 18 | 120 | 235 |
| 19 | Fructose | 19 | 105 | 215 |
| 20 | Fructose | 20 | 90 | 200 |
| 21 | Fructose | 21 | 80 | 180 |
| 22 | Fructose | 22 | 60 | 165 |
| 23 | Fructose | 23 | 50 | 140 |
| 24 | Fructose | 24 | 40 | 120 |
| 25 | Fructose | 25 | 20 | 95 |
| 26 | Fructose | 26 | 8 | 70 |
| 27 | Fructose | 27 | 0 | 50 |
| 28 | Fructose | 28 | — | 35 |
| 29 | Fructose | 29 | — | 15 |

It was found that at the colder five Celsius degree freezer-temperature range (−15 to −20° C.) it is possible to formulate pourable slushes at a higher ABV. Therefore table 1-2B above provides additional data for fructose content needed to achieve a pourable slush at these temperatures for an ABV up to 29.

At the warmest end of the range (−11 to −16° C.; Table 1-2A) a formulation must contain a minimum amount of fructose so it is still pourable at −16° C. At the coldest end of the range (−15 to −20° C.; Table 1-2B) a formulation may not contain more than a maximum amount before there is not sufficient ice formation for a slush at −15° C. Any formulation between these two extremes must have more than a minimum amount required for −11 to −16° C. and less than a maximum amount required for −15 to −20° C. Therefore, the results of Tables 1-2A and 1-2B can be summarised in Table 1-3 below.

TABLE 1-3

| | | ABV | Min g/L fructose added to achieve pourable slush over a range of −11 to −16° C. | Max g/L fructose added to achieve pourable slush over a range of −15 to −20° C. |
|---|---|---|---|---|
| 1 | Fructose | 1 | 312 | 490 |
| 2 | Fructose | 2 | 302 | 475 |
| 3 | Fructose | 3 | 288 | 460 |
| 4 | Fructose | 4 | 272 | 450 |
| 5 | Fructose | 5 | 258 | 435 |
| 6 | Fructose | 6 | 245 | 420 |
| 7 | Fructose | 7 | 230 | 405 |
| 8 | Fructose | 8 | 220 | 395 |
| 9 | Fructose | 9 | 210 | 380 |
| 10 | Fructose | 10 | 192 | 365 |
| 11 | Fructose | 11 | 175 | 350 |
| 12 | Fructose | 12 | 165 | 335 |

TABLE 1-3-continued

| | | ABV | Min g/L fructose added to achieve pourable slush over a range of −11 to −16° C. | Max g/L fructose added to achieve pourable slush over a range of −15 to −20° C. |
|---|---|---|---|---|
| 13 | Fructose | 13 | 148 | 320 |
| 14 | Fructose | 14 | 130 | 300 |
| 15 | Fructose | 15 | 120 | 285 |
| 16 | Fructose | 16 | 105 | 270 |
| 17 | Fructose | 17 | 90 | 250 |
| 18 | Fructose | 18 | 75 | 235 |
| 19 | Fructose | 19 | 58 | 215 |
| 20 | Fructose | 20 | 40 | 200 |
| 21 | Fructose | 21 | 25 | 180 |
| 22 | Fructose | 22 | 15 | 165 |

The results in Table 1-3 are plotted as shown in FIG. 2. It can be generally seen that the fructose loading values cover a broader range, when the slush of the invention is only required to perform within a five Celsius degree "window" of temperature between −11 to −20° C. Specifically, for the limits of −11 to −16° C., where the slush can form no more than 350 g/L ice to still be pourable at −16° C., and −15 to −20° C. where the slush can form no less than 100 g/L ice to still be thick enough at −15° C., the following equations apply.

Lower-Range Fructose Load:

$$y=-14.3x+331.8$$

Upper-Range Fructose Load:

$$y=-15.5x+513.3$$

where −14.3 and −15.5 are the respective graph gradients, 331.8 and 513.3 are the respective theoretical zero-intercept points with the y axis, x is the ABV value, and y is the amount of fructose to be used to achieve a pourable slush (at that ABV). For completeness the R-squared values are 0.9987 and 0.997 respectively.

Using these formulas, one can calculate the desired fructose content range for any % ABV formula. For example, for 14.2% ABV:

$$(-14.3 \times 14.2)+331.8=128.4 \text{ g/L fructose (lower content)}$$

$$(-15.5 \times 14.2)+513.3=296.6 \text{ g/L fructose (upper content)}$$

The amount of fructose required to make a pourable slush, for any other continuous five Celsius degree range within the target domestic freezer-temperature range of −11 to −20° C. (e.g. −13 to −18° C.), will obviously fall within the broad ranges outlined in Table 1-3 and FIG. 2.

It should be apparent from Tables 1-2A and 1-2B that the use of higher levels of fructose within the overall range in Table 1-3 will result in better performance as a pourable slush in colder-temperature freezers. Conversely, lower levels of fructose will be sufficient to produce performance as a pourable slush at warmer freezer temperatures. Such behaviour will aid a developer in formulating slush beverages for a range of freezer temperatures in a particular market.

For comparison, FIG. 3 includes the extended ABV range from Table 1-2B, in addition to the smaller ranges in Table 1-2A. The predictive formula for the extended ABV range is $y=-16.9x+526.3$, where y=fructose content (g/L) and x=ABV. The R-squared value is 0.9927.

Example 1 gives preferred data for fructose sugar only. It was then necessary to look at the use of other food sugars, e.g. glucose and sucrose. It was discovered that different sugars have different effects on the amount of ice that forms, in the production of a pourable slush.

Example 2

A similar set of data was generated as for Example 1, except with glucose substituted for fructose, but otherwise similarly resulting in a pourable slush at the extremes of freezer temperature, −11 and −20° C. These results are set out in Table 2-1 below.

TABLE 2-1

| | | ABV | Min g/L glucose added to achieve pourable slush at −20° C. | Max g/L glucose added to achieve pourable slush at −11° C. |
|---|---|---|---|---|
| 1 | Glucose | 1 | 435 | 530 |
| 2 | Glucose | 2 | 420 | 500 |
| 3 | Glucose | 3 | 405 | 480 |
| 4 | Glucose | 4 | 390 | 460 |
| 5 | Glucose | 5 | 375 | 435 |
| 6 | Glucose | 6 | 350 | 410 |
| 7 | Glucose | 7 | 340 | 390 |
| 8 | Glucose | 8 | 320 | 365 |
| 9 | Glucose | 9 | 305 | 340 |
| 10 | Glucose | 10 | 280 | 315 |
| 11 | Glucose | 11 | 265 | 290 |
| 12 | Glucose | 12 | 245 | 265 |
| 13 | Glucose | 13 | 230 | 240 |
| 14 | Glucose | 14 | 210 | 215 |
| 15 | Glucose | 15 | 195 | 195 |

The amount of glucose required to achieve comparable levels of pourability follows a similar trend to that for fructose, but a higher loading of glucose is necessary.

It is possible to generate the following prediction formulas from plots of glucose content against ABV, as in Example 1:

$$y_{lower}=-17.5x+457.7 \text{ and } y_{upper}=-24.0x+553.7,$$

where y=glucose content (g/L) and x=ABV value.

However, because there is a direct linear relationship between the effects of the fructose and glucose contents, and to simplify the invention, it was believed most important to determine an equivalent ingredient loading for glucose, compared to that for fructose. This can be done by determining the proportional amount of glucose required to achieve an equivalent sugar loading of fructose.

Given the accuracy of the invention, it is appropriate to assign glucose an "equivalence" value of 1.2 g for 1 g of fructose, i.e. 1.2 g of glucose can substitute for 1 g of fructose in a beverage slush formulation.

For taste (fructose, for example, is considered to be twice as sweet tasting as glucose) or economic reasons, it may be desirable to substitute sugars in a formulation, as is well known in the art. Therefore, an "equivalence-to-fructose" value would further allow blends of fructose and glucose (and other ingredients outlined below) to be determined for producing a beverage formulation according to the invention.

It was desirable to determine the impact of other ingredients (carbohydrates and otherwise) on a slush formulation.

Example 3

A similar set of data was generated as for Examples 1 and 2, except with sucrose substituted for fructose, but otherwise similarly resulting in a pourable slush at the extremes of freezer temperature, −11 and −20° C. These results are set out in Table 3-1 below.

TABLE 3-1

|   |         | ABV | Min g/L sucrose added to achieve pourable slush at −20° C. | Max g/L sucrose added to achieve pourable slush at −11° C. |
|---|---------|-----|------|------|
| 1  | Sucrose | 1  | 465 | 630 |
| 2  | Sucrose | 2  | 453 | 615 |
| 3  | Sucrose | 3  | 440 | 590 |
| 4  | Sucrose | 4  | 425 | 575 |
| 5  | Sucrose | 5  | 410 | 560 |
| 6  | Sucrose | 6  | 385 | 540 |
| 7  | Sucrose | 7  | 370 | 515 |
| 8  | Sucrose | 8  | 350 | 480 |
| 9  | Sucrose | 9  | 335 | 450 |
| 10 | Sucrose | 10 | 315 | 415 |
| 11 | Sucrose | 11 | 295 | 385 |
| 12 | Sucrose | 12 | 275 | 355 |
| 13 | Sucrose | 13 | 255 | 320 |
| 14 | Sucrose | 14 | 235 | 295 |
| 15 | Sucrose | 15 | 220 | 265 |
| 16 | Sucrose | 16 | 220 | 235 |
| 17 | Sucrose | 17 | 180 | 210 |
| 18 | Sucrose | 18 | 160 | 175 |
| 19 | Sucrose | 19 | 140 | 145 |
| 20 | Sucrose | 20 | 120 | 120 |

The amount of sucrose required to achieve comparable levels of pourability (related to ice content) follows a similar trend to those for fructose and glucose, except that an even higher loading of sucrose is necessary. When plotted, the equations of the respective trend lines are: $y_{lower} = -18.4 + 495.5$ and $y_{upper} = -28.1 + 688.7$, where y=sucrose content and x=ABV value.

Within the accuracy of the invention, it is appropriate to assign sucrose an "equivalence" value of 1.4 g per 1 g of fructose, i.e. 1.4 g of sucrose can substitute for 1 g of fructose in a beverage slush formulation.

It has been observed that, when using sucrose predominantly for ABV values less than 4, the products become too thick to remain pourable at the coldest freezer temperatures. Therefore, other sugars should be used in place of sucrose for these ABV values.

The foregoing now allows suitable blends of fructose, glucose and sucrose to be determined, because, as has been surprisingly observed, these ingredients have an additive effect, namely each ingredient has a different, linear relationship with pourability so they can be easily substituted.

However, it is important to note that, in an acidic environment (which will be the case in a large proportion of cocktail-type slush formulations), sucrose can be split by acid-catalysed hydrolysis into equal parts of fructose and glucose. Therefore, in such an acidic formulation, the contribution of sucrose to the freezing properties should be considered as that of a 50/50 blend of fructose and glucose.

Slush beverages are likely to be formulated from a variety of ingredients, many of which will have an impact, in conjunction with the carbohydrates, on the properties of the beverage as it freezes. Accordingly, further ingredients were analysed.

Example 4

TABLE 4-1

|   |          | ABV | Fructose Loading Example 1 | Fructose loading after adding 10 g Citric Acid | Reduction in Fructose (g) from Example 1 | Fructose loading after adding 10 g Malic Acid | Reduction in Fructose (g) from Example 1 |
|---|----------|-----|-----|-----|----|-----|----|
| 1  | Fructose | 1  | 330 | 325 | 5  | 325 | 5  |
| 2  | Fructose | 2  | 315 | 310 | 5  | 310 | 5  |
| 3  | Fructose | 3  | 305 | 300 | 5  | 300 | 5  |
| 4  | Fructose | 4  | 293 | 288 | 5  | 288 | 5  |
| 5  | Fructose | 5  | 280 | 275 | 5  | 275 | 5  |
| 6  | Fructose | 6  | 263 | 258 | 5  | 260 | 3  |
| 7  | Fructose | 7  | 255 | 250 | 5  | 250 | 5  |
| 8  | Fructose | 8  | 245 | 240 | 5  | 240 | 5  |
| 9  | Fructose | 9  | 230 | 225 | 5  | 225 | 5  |
| 10 | Fructose | 10 | 220 | 215 | 5  | 215 | 5  |
| 11 | Fructose | 11 | 210 | 205 | 5  | 205 | 5  |
| 12 | Fructose | 12 | 195 | 190 | 5  | 190 | 5  |
| 13 | Fructose | 13 | 185 | 180 | 5  | 180 | 5  |
| 14 | Fructose | 14 | 170 | 165 | 5  | 165 | 5  |
| 15 | Fructose | 15 | 155 | 150 | 5  | 150 | 5  |
| 16 | Fructose | 16 | 145 | 140 | 5  | 138 | 7  |
| 17 | Fructose | 17 | 130 | 122 | 8  | 122 | 8  |
| 18 | Fructose | 18 | 120 | 110 | 10 | 110 | 10 |
| 19 | Fructose | 19 | 105 | 100 | 5  | 100 | 5  |
|    |          |    |     | Average +/− | 5.4 2 | Average +/− | 5.4 2 |

Table 4-1 includes a column where a minimum amount of fructose that must be added to achieve a pourable slush at −20° C. according to Table 1-1 and compares this with how much fructose must be removed to restore the same pourability characteristics after 10 g of acid is added. Table 4-1 illustrates two points: firstly, that both citric acid and malic acid have an equivalent overall effect on fructose loading, and secondly, that the effect of an acid on fructose loading is approximately 2 for 1, i.e. for every 1 g of acid added to a formulation, the fructose loading must be adjusted (reduced) by 0.5 g. Therefore, within the accuracy of the invention, it is appropriate to assign such food acids an "equivalence" value of 2 g per 1 g of fructose.

Example 5

In accordance with the invention, it has been found that the addition of an ice-morphology-modification ingredient can improve mouthfeel and flow characteristics of the slush, due to the way ice crystals pack during freezing. The preferred additive is gelatin hydrolysate. Therefore, the effect of this ingredient on freeze characteristics needed to be assessed, i.e. determining how much fructose must be removed to compensate for the addition of gelatine hydrolysate in a formulation that otherwise has the same pourability characteristics.

Table 5-1 (including data for a minimum amount of fructose that must be added to achieve a pourable slush at −20° C. according to Table 1-1) reveals that the effect of gelatin hydrolysate on fructose loading is equivalent to 14/25, i.e. an addition of 25 g of gelatin required the removal of 14 g of fructose, in order to achieve the same slush pourability characteristics. In other words, for every 1 g of gelatin added to a formulation, the corresponding fructose loading must be adjusted (reduced) by 0.56 g.

TABLE 5-1

|    |          | ABV | Fructose Loading Example 1 | Fructose loading after adding 25 g Gelatin Hydrolysate | Reduction in Fructose (g) from Example 1 |
|----|----------|-----|-----|-----|-----|
| 1  | Fructose | 1   | 330 | 315 | 15  |
| 2  | Fructose | 2   | 315 | 302 | 13  |
| 3  | Fructose | 3   | 305 | 292 | 13  |
| 4  | Fructose | 4   | 293 | 280 | 13  |
| 5  | Fructose | 5   | 280 | 265 | 15  |
| 6  | Fructose | 6   | 263 | 252 | 11  |
| 7  | Fructose | 7   | 255 | 242 | 13  |
| 8  | Fructose | 8   | 245 | 232 | 13  |
| 9  | Fructose | 9   | 230 | 218 | 12  |
| 10 | Fructose | 10  | 220 | 208 | 12  |
| 11 | Fructose | 11  | 210 | 198 | 12  |
| 12 | Fructose | 12  | 195 | 183 | 12  |
| 13 | Fructose | 13  | 185 | 172 | 13  |
| 14 | Fructose | 14  | 170 | 158 | 12  |
| 15 | Fructose | 15  | 155 | 140 | 15  |
| 16 | Fructose | 16  | 145 | 130 | 15  |
| 17 | Fructose | 17  | 130 | 115 | 15  |
| 18 | Fructose | 18  | 120 | 104 | 16  |
| 19 | Fructose | 19  | 105 | 90  | 15  |
|    |          |     |     | Average | 14 |
|    |          |     |     | +/−     | 2  |

Therefore, in line with the above, and within the accuracy of the invention, it is appropriate to assign gelatin hydrolysate an "equivalence" value of 1.8 g per 1 g of fructose.

Example 6

Multiple additives generally have a cumulative effect on the equivalent fructose loading; therefore, it was desired to determine the freeze characteristics of a formulation that contained both a food acid, as in Example 4, and an ice-crystal-morphology-modifying ingredient, as in Example 5. The results are shown in Table 6-1.

TABLE 6-1

|    |          | ABV | Fructose Loading Example 1 | Fructose loading after adding 25 g Gelatin Hydrolysate and 10 g Citric Acid | Reduction in Fructose from Example 1 |
|----|----------|-----|-----|-----|-----|
| 1  | Fructose | 1   | 330 | 308 | 22  |
| 2  | Fructose | 2   | 315 | 295 | 20  |
| 3  | Fructose | 3   | 305 | 287 | 18  |
| 4  | Fructose | 4   | 293 | 272 | 21  |
| 5  | Fructose | 5   | 280 | 258 | 22  |
| 6  | Fructose | 6   | 263 | 245 | 18  |
| 7  | Fructose | 7   | 255 | 235 | 20  |
| 8  | Fructose | 8   | 245 | 225 | 20  |
| 9  | Fructose | 9   | 230 | 210 | 20  |
| 10 | Fructose | 10  | 220 | 200 | 20  |
| 11 | Fructose | 11  | 210 | 190 | 20  |
| 12 | Fructose | 12  | 195 | 175 | 20  |
| 13 | Fructose | 13  | 185 | 165 | 20  |
| 14 | Fructose | 14  | 170 | 150 | 20  |
| 15 | Fructose | 15  | 155 | 132 | 23  |
| 16 | Fructose | 16  | 145 | 122 | 23  |
| 17 | Fructose | 17  | 130 | 107 | 23  |
| 18 | Fructose | 18  | 120 | 96  | 24  |
| 19 | Fructose | 19  | 105 | 82  | 23  |
|    |          |     |     | Average | 21 |
|    |          |     |     | +/−     | 2  |

Table 6-1 (again, including data for a minimum amount of fructose that must be added to achieve a pourable slush at −20° C. according to Table 1-1) shows the cumulative effect of added gelatin hydrolysate and citric acid. From the results for Examples 4 and 5, it would be expected that the effect of adding 25 g of gelatin hydrolysate and 10 g of citric acid would calculate (25/1.8+10/2=) to a correction value of 19 for the reduction in fructose content. The observed value was 21, which is acceptable within the accuracy of the invention, especially since sugars will be in considerably higher concentrations in the formulation, and therefore, will have the most significant impact on its ability to form a pourable slush.

Example 7

Tables 7-1 and 7-2 include data for an added emulsion (e.g. fat) content of 5, 10 or 20% (i.e. 50, 100 or 200 mL of emulsion in one litre of total formulation). The corresponding modification to the fructose content shows how emulsion content affects total fructose loading. For the purposes of the invention, an 'emulsion' can include any water insoluble ingredient.

The effect on fructose loading is linear, as with previous ingredients in general. It can be seen that the addition of 100 mL of emulsion requires the removal of 46 g of fructose, in order to achieve equivalent effect on slush pourability for the same ABV value. Accordingly, the equivalence value for emulsion is 2.2 g per 1 g of fructose, within the accuracy of the invention. This result can be included with the set of previous fructose-equivalent values.

TABLE 7-1

|   | | Min g/L fruct only - from example 1 (−20) | +50 mL Emulsion | | +100 mL Emulsion | | +200 mL Emulsion | |
|---|---|---|---|---|---|---|---|---|
|   | | | g/L fruct added | Reduction in Fructose from Example 1 | g/L fruct added | Reduction in Fructose (g) from Example 1 | g/L fruct added | Reduction in Fructose (g) from Example 1 |
| 1 | Fructose | 330 | 308 | 22 | 285 | 45 | 238 | 92 |
| 2 | Fructose | 315 | 295 | 20 | 270 | 45 | 225 | 90 |
| 3 | Fructose | 305 | 285 | 20 | 261 | 44 | 215 | 90 |
| 4 | Fructose | 293 | 270 | 23 | 247 | 46 | 200 | 93 |
| 5 | Fructose | 280 | 255 | 4 | 233 | 47 | 185 | 95 |
| 6 | Fructose | 263 | 242 | 21 | 220 | 43 | 173 | 90 |
| 7 | Fructose | 255 | 235 | 20 | 210 | 45 | 162 | 93 |
| 8 | Fructose | 245 | 225 | 20 | 200 | 45 | 152 | 93 |
| 9 | Fructose | 230 | 210 | 20 | 185 | 45 | 140 | 90 |
| 10 | Fructose | 220 | 200 | 20 | 175 | 45 | 128 | 92 |
| 11 | Fructose | 210 | 190 | 20 | 165 | 45 | 118 | 92 |
| 12 | Fructose | 195 | 175 | 20 | 150 | 45 | 100 | 95 |
| 13 | Fructose | 185 | 160 | 25 | 140 | 45 | 90 | 95 |
| 14 | Fructose | 170 | 148 | 22 | 125 | 45 | 75 | 95 |
| 15 | Fructose | 155 | 130 | 25 | 108 | 47 | 60 | 95 |
| 16 | Fructose | 145 | 120 | 25 | 98 | 47 | 50 | 95 |
| 17 | Fructose | 130 | 105 | 25 | 80 | 50 | 30 | 100 |
| 18 | Fructose | 120 | 95 | 25 | 70 | 50 | 20 | 100 |
| 19 | Fructose | 105 | 82 | 23 | 58 | 47 | 10 | 95 |
|   |   |   | Average +/− | 22 6 | Average +/− | 46 2 | Average +/− | 92 2 |

TABLE 7-2

|   | | Max g/L fruct. only - from example 1 (−11) | +50 mL Emulsion | | +100 mL Emulsion | | +200 mL Emulsion | |
|---|---|---|---|---|---|---|---|---|
|   | | | g/L fruct added | Reduction in Fructose from Example 1 | g/L fruct added | Reduction in Fructose from Example 1 | g/L fruct added | Reduction in Fructose from Example 1 |
| 1 | Fructose | 440 | 415 | 25 | 395 | 45 | 350 | 90 |
| 2 | Fructose | 425 | 400 | 25 | 380 | 45 | 335 | 90 |
| 3 | Fructose | 410 | 388 | 22 | 365 | 45 | 320 | 90 |
| 4 | Fructose | 395 | 370 | 25 | 350 | 45 | 305 | 90 |
| 5 | Fructose | 380 | 360 | 20 | 335 | 45 | 290 | 90 |
| 6 | Fructose | 360 | 340 | 20 | 320 | 40 | 270 | 90 |
| 7 | Fructose | 345 | 320 | 25 | 300 | 45 | 253 | 92 |
| 8 | Fructose | 320 | 295 | 25 | 275 | 45 | 228 | 92 |
| 9 | Fructose | 305 | 280 | 25 | 260 | 45 | 210 | 95 |
| 10 | Fructose | 285 | 260 | 25 | 240 | 45 | 190 | 95 |
| 11 | Fructose | 260 | 240 | 20 | 215 | 45 | 170 | 90 |
| 12 | Fructose | 248 | 225 | 23 | 200 | 48 | 155 | 93 |
| 13 | Fructose | 225 | 200 | 25 | 180 | 45 | 130 | 95 |
| 14 | Fructose | 210 | 185 | 25 | 160 | 50 | 115 | 95 |
| 15 | Fructose | 190 | 165 | 25 | 140 | 50 | 95 | 95 |
| 16 | Fructose | 170 | 145 | 25 | 125 | 45 | 75 | 95 |
| 17 | Fructose | 150 | 125 | 25 | 100 | 50 | 55 | 95 |
| 18 | Fructose | 125 | 102 | 23 | 80 | 45 | 30 | 95 |
| 19 | Fructose | 105 | 80 | 25 | 55 | 50 | 10 | 95 |
|   |   |   |   |   | Average +/− | 46 3 | Average +/− | 93 2 |

Alternative Additives

A number of other food-grade ingredients are commonly used in beverage formulations and possible for use with the invention. Table 8-1 below includes the fructose equivalent loading values for several such alternative additives.

TABLE 8-1

| Additive | Amount Added (g/L) | Fructose Removed (g/L) | Equivalence (substitution value) |
|---|---|---|---|
| Propylene Glycol | 10 | 8 | 1.25 |
| Betaine | 10 | 15 | 0.67 |
| Trehalose | 10 | 7 | 1.43 |
| Erythritol | 10 | 7 | 1.43 |
| Sorbitol | 10 | 7 | 1.43 |
| Isomaltulose | 10 | 5 | 2.00 |
| Maltodextrin | 10 | 3.5 | 2.86 |
| Glycerol | 10 | 8 | 1.25 |

Table 8-1 shows substitution values for a range of ingredients. However, a knowledgeable beverage developer will know that there are common-sense limits on the useable amounts of sugar alcohols. Therefore, the addition of such ingredients may be limited in practice by regulations in connection with daily allowances of food additives.

The data contained in Tables 7-1, 7-2 and 8-1 also suggest how to deal with the effect of flavour additives on a formulation, because flavours are typically either emulsion-based or ethanol- and/or propylene glycol-based. Therefore, the above data for emulsions or propylene glycol can be applied.

The 2.86 substitution value for maltodextrin from Table 8-1 can be used for all maltodextrins between 30,000 to 80,000 da (e.g. Cargill C*01915; C*01955; C*01958). If maltodextrins outside these ranges are used it may be necessary to make adjustments to the substitution value.

Formulation Method

In connection with formulation and determining fructose equivalent substitution values it will be apparent that the foregoing examples follow a general method that can be utilised for formulating a slush beverage for use in a domestic freezer. The method involves:

1. Calculating a minimum amount of fructose dependent on a decided or determined alcohol content (ABV), according to the equation:

minimum fructose (g/L)=(−14.3×ABV)+331.8;

2. Optional substitution of fructose by other ingredients at ratios established by observing desirable slush forming characteristics for a given ingredient compared to fructose, thereby determining a fructose equivalent value for any other ingredient;
3. Calculating the contribution of each ingredient to the amount of total ingredients according to its fructose equivalent value;
4. Formulating the beverage with ingredients as needed and ensuring the total ingredient value (g/L) does not fall below the calculated minimum and ABV is maintained at the determined or decided level.

It will be apparent that the equation from step 1 is derived from Table 1-2, based on a continuous five degree range of freezer temperatures. The equation could be derived from the more desirable nine degree range of Table 1-1.

Step 2 can be carried out by assessing the amount of a new ingredient needed to form a desirable slush at a given ABV and comparing this amount to fructose. In other words the ingredient is assessed (as in Examples 2 and 3) in a system where it is combined with alcohol and water only. Alternatively, the ingredient can be assessed (as in Examples 4 to 7) by using a fructose based slush formulation system and removing some fructose to be substituted with the new ingredient to restore it to the same slush pourability at a given ABV. The amount of ingredient needed to replace the fructose and restore the formulation to achieve a pourable slush gives its fructose equivalent value and enables a ratio to be determined.

It should be noted that fructose has been chosen as the primary "reference ingredient" in development of the present invention. However, it would be possible to perform the method by reference to another sugar, e.g. glucose or sucrose. In this case, the minimum amount equation referred to at step 1 above would be minimum equations found in Examples 2 and 3. All ratios would then be determined by comparison to the new reference ingredient.

Supercooling and Ice Nucleators

During cooling, an aqueous solution will reach its melting point, which is influenced by freezing-point depression, and typically will begin to supercool. It will continue to remain as a liquid during cooling, until either heterogeneous or homogeneous ice nucleation occurs.

During experimental development of the present invention for the US market and its specific freezer-temperature distribution, regular occurrences of supercooling were observed over a forty-eight-hour period, resulting in product failure. The slush beverage formulations in the freezer had reached a steady-state temperature below the theoretical melting temperature, but contained no ice. Agitating a sample could induce ice formation in the product, but due to the energy released as heat through the ice-crystallisation process, the product temperature would be raised. The result of this heating was an unacceptable product performance, due to low ice content, with the appearance of an ice layer on top of a liquid beverage, but not a uniform slush. Supercooling of up to 12 Celsius degrees below the melting temperature was observed in test formulations, with 10 Celsius degrees of supercooling occurring in up to 60% of all samples.

An ice nucleator is an additive that induces heterogeneous nucleation of ice, once the temperature of an aqueous solution is lowered below its melting point, but is still at a temperature above its homogeneous ice nucleation point. The present invention recommends the use of such ingredients to obtain a commercially viable product, through ensuring that ice formation occurs within a broad range of freezer temperatures.

Plant phytosterols have been identified as a preferred source of ice nucleators for the invention. Phytosterols such as beta-sitosterol, diosgenin, and blended phytosterols (beta-sitosterol, campesterol, stigmasterol) all show ice-nucleation activity. However, within a fixed time period, none is as efficient as stigmasterol alone.

It has been found that the addition of very low levels of pure stigmasterol (1 to 10 mg per 250 mL sample of liquid) is able to induce consistent ice nucleation in test formulations. Stigmasterol has been shown to limit supercooling to a maximum of 4 Celsius degrees below the melting point in test systems, performance similar to that of commercial Snowmax™ (which is not allowable in an edible product) in the test formulations.

Nucleation functionality is retained, as long as the nucleator is in contact with the water in the liquid phase during the freezing process. To be functional, the plant sterol could be:
  added directly as a solid (e.g. in powder form);
  dissolved in absolute ethanol and then precipitated upon addition to a formulation, thus lowering the ethanol concentration below 80% ABV;
  embedded within a solid material, which has some portion of the nucleator at the surface of the material that is in contact with the liquid.

Whilst Stigmasterol is a preferred nucleator for the system of the present invention, any material capable of reducing the extent of supercooling is of benefit to the invention. This could include, but is not limited to: sterols, phytosterols, cholesterol, beta-sitosterol, diosgenin, campesterol, calcium silicate, kaolin (aluminium silicate), bentonite, triacontanol, microcrystalline cellulose, tocopherol, silver iodide, calcium carbonate, titanium dioxide, silicon dioxide, calcium phosphate, and ice-nucleating bacteria.

Ice-Crystal-Morphology Modification

Consideration was given to the structure of the ice that forms in a slush. Different ice-crystal shapes will enable different packing densities and thus alter textural properties of a slush.

In test formulations in colder freezers, without ice-growth-control ingredients, various plates, needles, and dendritic ice structures were observed to form, potentially all in the same test sample. The result of this was to inhibit the ability to dispense a slush product, or more importantly, to provide the wrong mouthfeel for a product.

In nature, many organisms, including fish and plants such as winter-hardy crops, are able to exist in sub-zero environments, such as in Arctic waters, by evolution of a series of antifreeze peptides (AFP) that control ice-crystal morphology (see A. C. DeVries, Annu. Rev. Physiol., 1983, 45, 245-260; C. L. Hew, D. S. C. Yang, Eur. J. Biochem., 1992, 203, 33-42). The term antifreeze peptide is somewhat misleading; these peptides do not depress the freezing point of an aqueous system at the very low concentrations typically observed, but rather act to control ice growth. This occurs by a mechanism by which ice formation occurring in the cellular structures of fish or plants does not cause rupturing of tissue, which would lead to cell death. These peptides have been shown (see M. M. Harding, L. G. Ward, A. D. D. Haymet, Eur. J. Biochem., 1999, 264, 653-665) to interact with the growing face of an ice crystal, creating point defects and slowing the ice growth on specific ice-crystal faces, thus kinetically hindering growth and altering crystal morphology.

These proteins were included in the formulation of the invention, so as to convert the morphology of the ice crystals from large plate and dendrite structures to smaller, regular needle-shaped crystals. These proteins function to provide an ice-crystal structure that packs more regularly and thus aids dispensability, when generated under quiescent conditions.

The incorporation of Fish AFP Type I or Fish AFP Type III (10 mg-25 mg (per litre of product), sourced from A/F Protein Canada), in formulations according to the foregoing examples, results in a more granular ice structure, noticeable even audibly by showing different acoustic properties during shaking after reaching a steady-state temperature, after having frozen in a container. The dosing level of the AFP must be adjusted slightly, based on the activity of a given AFP batch.

The observed benefit shows a concentration-dependent effect, and overdosing with antifreeze peptides (>50 mg/L) leads to significant over-hardening of the ice structure. Insufficient dosing with AFPs (<6 mg/L) also leads to a loss of optimal activity, as there is limited modification of ice-crystal shape; however, reduction in the extent of over-hardening was observed.

There is literature evidence showing that the activity of antifreeze peptides lies in a repeat peptide region rich in glycine content (see L. A. Graham, P. L. Davis, Science, 2005, 310, 461). Consideration of other proteins that would contain such peptide regions led to gelatin, the denatured form of collagen.

Use of gelatin hydrolysate is believed to provide better ice-crystal control than that from anti-freeze peptides, and that functionality is displayed to some degree by commercially available gelatin hydrolysates. Samples of pig gelatin hydrolysates were received from Gelita and Rousselot, and had a variety of molecular weight distributions. Hydrolysates with molecular weight ranges of 2000-5000 Da, 5000-10000 Da, and 10000-20000 Da were obtained and added to the slush formulations at dosing levels of 1 to 50 g/L. A variety of ice morphologies was reproducibly observed in the formulations, but only for relatively high dosing levels (20-50 g/L).

It was discovered that, by varying the gelatin concentration, several reproducible textures could be obtained. At lower addition levels (approx. 1-15 g/L, depending on the gelatin hydrolysate selected), a coarse-plate structure was produced, typical of a 'shale' ice product that usually relies on a cutting blade to produce plates. At higher addition levels (approx. 15-50 g/L, depending on the gelatin hydrolysate selected), a very smooth texture was obtained; the ice particles were small enough to be described as unnoticeable. This texture resembled that produced in a highly blended frozen product, yet without the residual few ice chunks that sometimes persist. The variation in effect of dosing level was observed when switching between different commercial samples of hydrolysate from porcine, bovine or fish gelatin, and was attributed to differences in hydrolysate production methods. Limitations on usage of some commercial gelatin hydrolysates exist, due to carryover taste taints, which were only discoverable within specific designs of beverage flavours; those systems with lighter flavours are more susceptible to noticeable gelatin hydrolysate flavour taint.

The addition of an ingredient to modify ice-crystal morphology allows for variation of mouthfeel textures, within a beverage application across the domestic freezer-temperature range, and within slush formulations that have been designed to maintain the characteristic of being a pourable slush across a targeted freezer-temperature range. Adding higher amounts (15-50 g) of such an ingredient can aid in pourability of the slush of the invention.

Sample Formulations

A pourable slush beverage according to the invention can be formulated in line with the foregoing description. For example, if a 10% ABV Frozen Citrus Cocktail is desired, using the equations and in reference to Table 1-1 it can be seen that 220-285 g/L of fructose is necessary to obtain a pourable slush in domestic freezers. By formulating to the lower end of the range a slightly thicker slush across the 9 Celsius degree range will result which, for a citrus drink, may be desired. Accordingly the formulation will perform with 230 g/L fructose as in Formulation A below. It is also preferable to include an ice nucleator to ensure freezing.

Formulation A

Ethanol (Grain Neutral Spirit @ 96.4%) 103.7 mL
Fructose (crystalline) 230 g
Stigmasterol 0.05 g
Demineralised Water (to volume 1 L)

All fruit drinks have acidic characteristics so extra ingredients must be incorporated with a corresponding reduction in the fructose content according to the ratios described. For example, it may be desirable to add 8 g of citric acid; a common component of fruit. As citric acid has an equivalence ratio of 2.0, 4 g of fructose (8/2.0) must be removed to maintain the same pouring characteristics. Building on Formulation A, at 230 g/L fructose, fructose content needs to be reduced to 226 g/L as exemplified by Formulation B.

Formulation B

Ethanol (Grain Neutral Spirit @ 96.4%) 103.7 mL
Fructose (crystalline) 226 g
Citric acid (anhydrous) 8 g
Stigmasterol 0.05 g
Demineralised Water (to volume 1 L)

Upon tasting it could be considered that this formulation is perceived as too sweet. To reduce sweetness a beverage developer would normally reduce sugar content, however, it is not possible to simply remove some fructose as a minimum level of ingredients are required for pourability in a freezer. Accordingly an alternative, lower sweetness, sugar could be used, such as glucose which is perceived as at least half as sweet as fructose. According to the invention, if 50 g of fructose is to be replaced by glucose, it must be scaled up by 1.2 (the equivalence ratio for glucose to fructose). This results in 60 g glucose as in Formulation C.

Formulation C
Ethanol (Grain Neutral Spirit @ 96.4%) 103.7 mL
Fructose (crystalline) 176 g
Glucose (crystalline) 60 g
Citric acid (anhydrous) 8 g
Stigmasterol 0.05 g
Demineralised Water (to volume 1 L)

It is then likely that flavours, e.g. lemon/orange, would be added to give the desired product profile. Flavours are usually delivered with propylene glycol as a solvent and, accordingly, further fructose (or an equivalent amount of another ingredient) must be removed to compensate. Through the addition of 5 g of propylene glycol based flavours there must be a corresponding reduction of 4 g fructose (5/1.25) to result in Formulation D.

Formula D
Ethanol (Grain Neutral Spirit @ 96.4%) 103.7 mL
Fructose (crystalline) 172 g
Glucose (crystalline) 60 g
Citric acid (anhydrous) 8 g
Flavours (citrus) 5 g
Stigmasterol 0.05 g
Demineralised Water (to volume 1 L)

This formulation can then be bottled, placed in a domestic freezer and left for sufficient time to establish a steady-state temperature to become a pourable slush.

Further illustrative formulations below also meet the requirements of the invention, i.e. they produce a pourable slush across a desired freezer-temperature range of −11 to −20° C.

| Emulsion-Containing Formulation E (13% ABV): | |
| --- | --- |
| Ethanol (96.4%) | 134.8 mL (105 g) |
| Emulsion | 25 mL |
| Sucrose | 240 g |
| Sol D Gelatin Hydrolysate (Gelita) | 50 g |
| Chocolate Flavours | 3 mL |
| Stigmasterol | 0.1 g |
| Demineralised Water to 1000 mL total volume | |

Applying the fructose-equivalent conversion factors for each of the ingredients, the total fructose value is (11.4+171+27+2.4=) 212 g/L, assuming the flavour is dissolved in propylene glycol. This fructose value is within the ranges for 13% ABV shown in Tables 1-1 and 1-3; hence, it can be expected to result in a pourable slush in the freezer-temperature range between −11 and −20° C.

For an emulsion-containing formulation, the procedure for blending of ingredients would be as follows. Dissolve the required sugar(s) in a minimum volume of demineralised water. Use of a shear mixer such as a Silverson L5M aids rapid hydration of powdered ingredients, and/or gentle heating can be applied if necessary. The emulsion would then be added at this point; this could be as simple as adding a commercially available, pre-made emulsion or adding a fat source such as butterfat, or other food oil, along with a suitable emulsification agent, and applying high pressure and mixing to create an emulsion with stable particle size. The gelatin hydrolysate, pre-dissolved in demineralised water using gentle heat if required, can be added along with all the other ingredients, including acids. It should be noted that care must be taken to avoid detrimental acidification of gelatin hydrolysate and/or any other protein being incorporated. If care is not taken, with respect to the isoelectric point of the protein, decomposition can occur. The required amount of ethanol should then be added, with any flavours pre-dissolved in the ethanol (if it is an ethanol-based flavour) or added separately, if a flavour dissolved in an oil or propylene glycol is used. The solution should then be taken to its full 1000 mL volume using demineralised water, with gentle stirring applied to ensure homogeneity. The sample would then be poured into a plastic bottle and have 0.1 g of stigmasterol added as a powder (as one dosing option).

| Cocktail Test-Formulation F (14% ABV): | |
| --- | --- |
| Ethanol (96.4%) | 145.2 mL |
| Fructose, Crystalline | 140 g |
| Glucose, Crystalline | 40 g |
| Gelatin, Gelita Sol D | 20 g |
| Maltodextrin (Fibresol 2) | 10 g |
| Citric Acid (Anhydrous) | 6 g |
| Citrus Flavours | 5 mL |
| Stigmasterol | 0.1 g |
| Demineralised Water | to 1000 mL |

Applying the fructose-equivalent conversion factors for each of the above ingredients, the total fructose value is (33.33+11.11+3.5+3+4=) 195 g/L, assuming flavour is dissolved in propylene glycol. This fructose value is within the ranges for 14% ABV shown in Tables 1-1 and 1-3; hence, it can be expected to result in a pourable slush in the freezer-temperature range between −11 and −20° C.

For a non-emulsion-containing formulation, the procedure for blending of ingredients would include dissolving the sugars and any gelatin hydrolysate in the minimum possible amount of demineralised water. Use of a shear mixer such as a Silverson L5M aids rapid hydration of powdered ingredients, and/or gentle heating can be applied if necessary. After this, any acids can be added, along with other ingredients. It should be noted, as above, that care must be taken to avoid detrimental acidification of gelatin hydrolysates. The required ethanol should then be added, with any flavours pre-dissolved in the ethanol (if it is an ethanol-based flavour) or added separately, if the flavour is oil- or propylene glycol-based. The solution should then be taken to its full 1000 mL volume using demineralised water, with gentle stirring applied to ensure homogeneity.

When substituting for fructose with other sugars, some common sense is required. For the lowest ABV values, when replacing 300 g of fructose with 420 g of sucrose, whilst the sweetness may be on a par (due to the lower relative sweetness of sucrose), other product development issues arise, such as concern about caloric count and cloying mouthfeel. It has been found beneficial to use glucose to lower the overall sweetness of a formulation, as glucose has a lower fructose-equivalent value than sucrose, thereby reducing sweetness while not increasing calories excessively. It is known that there are intake limitations on the usage of sugar alcohols, due to possible digestive discomfort.

The sample would be poured into a plastic bottle and have 0.1 g of stigmasterol added as a powder (as one dosing option). Enough headspace must be left in the bottle to allow suitable space for shaking of the product.

Formulations according to the invention are preferably packaged in suitable flexible plastic bottles with an opening of at least 25 mm diameter—ideally, a lot wider opening of 38 mm diameter—with a neck and shoulder shaped to aid dispensing of slush. FIG. 4 illustrates a series of preferred bottle profiles. In bottle A, it can be seen that the shoulder is bowed into the bottle interior, which has the effect of aiding dispensing, as it enables slush to be extruded through the neck. The same can be noticed for bottle C, which has a 'funnel'-type neck (straight-walled). However, bottle D may serve with requirement for extra squeezing or shaking in the coldest freezers, where the product would be least pourable, as a 'catching area' between the shoulder of the design and the neck fitment exists (inverted bowl shape). In bottle B, a second feature is shown, i.e. an indented rib, which serves to aid one's grip on the frozen block of product, when removing the product from the freezer and giving it an initial squeeze. This indented rib stops the frozen block from moving up and down inside the pack, without fracturing the brittle network of ice. The typical serving amount is likely to be between 300 and 800 mL.

CONCLUSION

The foregoing description refers to fructose as the base-value ingredient, and all other ingredients are related back to fructose's base value. However, it is also possible to define an arbitrary unit (e.g. a "Sugar Unit", SU or simply F) with a base value of 1 (preferably, equal to 1 g fructose), for the purposes of simplification. The remaining ingredients would relate back to this F value, e.g. glucose=1.2 F, sucrose=1.4 F, etc.

Any ingredients not mentioned herein (e.g. preservatives, artificial sweeteners) may have an impact on pourability of a beverage formulation but are more likely to be added in such small amounts as to not have any major effect.

Effectively, the invention provides the capability to formulate slush beverages for a practical "window" of freezer temperatures (i.e. over a five Celsius degree or greater range), and produces an acceptable, pourable slush, once the beverage has reached a steady-state freezer temperature (generally after twelve hours and almost always within twenty-four hours, dependent on the efficiency of the freezer). This is achieved through managing the content of fructose and other ingredients with particular fructose-equivalent values with respect to alcohol content of the formulation, and optionally using an ice nucleator and ice-crystal-morphology control.

The invention claimed is:

1. An alcoholic beverage formulation that forms a pourable slush across a range of at least five Celsius degrees between −11 and −20° C., that comprises:
    water;
    an amount of ethanol such that the pourable slush has a maximum alcohol by volume (ABV) of 19;
    a sugar selected from the group of fructose, sucrose, glucose and combinations thereof;
    an ice nucleator ingredient;
    a total ingredient content for a given ABV (Alcohol By Volume) within a range calculated from the equations:

minimum total ingredient content=(−14.3×ABV)+331.8 maximum total ingredient content=(−15.5×ABV)+513.3 where ingredients, measured in g/L, accumulate to contribute to the total ingredient content but are first divided by a value F dependent on the ingredient, the ingredients contributing to the total ingredient content include the sugar, wherein fructose has an F value of 1.0, glucose has an F value of 1.2, and sucrose has an F value of 1.4, and other ingredients being selected from the group of:

| Ingredient | F |
|---|---|
| Acid | 2.0 |
| Emulsion | 2.2 |
| Gelatin Hydrolysate | 1.8 |
| Propylene Glycol | 1.25 |
| Betaine | 0.67 |
| Trehalose | 1.43 |
| Erythritol | 1.43 |
| Sorbitol | 1.43 |
| Isomaltulose | 2.0 |
| Glycerol | 1.25 |
| Maltodextrin | 2.86 | wherein the water and the ice nucleator ingredient do not contribute to the total ingredient content, and further wherein the formulation contains no a gum.

2. The alcoholic beverage formulation of claim 1 wherein the slush is pourable across the full nine Celsius degrees range between −11 and −20° C., and the equations are substituted for the narrowed range of:

minimum total ingredient content (g/L)=(−12.3×ABV)+341.1 maximum total ingredient content (g/L)=(−18.7×ABV)+468.9.

3. The alcoholic beverage formulation of claim 1, wherein the ice nucleator ingredient is a plant phytosterol.

4. The alcoholic beverage formulation of claim 3, wherein the ice-nucleator ingredient is stigmasterol.

5. The alcoholic beverage formulation of claim 1 comprising gelatin hydrolysate.

6. An alcoholic beverage formulation that forms a pourable slush across a range of at least five Celsius degrees between −11° C. and −20° C., comprising, per Litre:
    between 120 mL and 140 mL ethanol;
    between 169 F g and 244 F g of a sugar selected from the group of fructose, glucose, sucrose, and combinations thereof, wherein F=1 for fructose, F=1.2 for glucose, and F=1.4 for sucrose;
    between 2 and 10 g acid;
    an ice nucleator ingredient; and
    balance water,
    wherein the formulation contains no stabilizer comprising a gum.

7. The alcoholic beverage formulation of claim 6, further comprising between 5 g and 30 g gelatin hydrolysate.

8. The alcoholic beverage formulation of claim 6, further comprising flavors in an amount less than or equal to 20 mL.

9. The alcoholic beverage formulation of claim 6, wherein the ice nucleator ingredient is stigmasterol and is present in an amount between 0.005 g and 0.1 g.

10. An alcoholic beverage formulation that forms a pourable slush across a range of at least five Celsius degrees between −11° C. and −20° C., comprising:
    between 120 mL and 140 mL ethanol;
    between 10 g and 50 g emulsion;
    between 150 F g and 214 F g of a sugar selected from the group of fructose, glucose, sucrose, and combinations thereof, wherein F=1 for fructose, F=1.2 for glucose, and F=1.4 for sucrose;
    gelatin hydrolysate in an amount less than or equal to 30 g;
    stigmasterol in an amount less than or equal to 0.1 g;
    between 2 mL and 10 mL flavors; and
    demineralized water to 1000 mL total volume,
    wherein the formulation contains no gum.

11. A method of using an alcoholic beverage formulation comprising the steps of:

formulating the alcoholic beverage formulation by calculating a total ingredient content for an alcoholic beverage having a given ABV (alcohol by volume), wherein the total ingredient content is within a range calculated from the equations:

minimum total ingredient content=(−14.3×ABV)+ 331.8 maximum total ingredient content=(−15.5×ABV)+ 513.3 where ingredients, measured in g/L, accumulate to contribute to the total ingredient content but are first divided by a value F dependent on the ingredient, wherein the alcoholic beverage formulation comprises ethanol, a sugar selected from the group consisting of fructose having an F value of 1.0, glucose having an F value of 1.2, and sucrose having an F value of 1.4, an ice nucleator ingredient wherein the ice nucleator ingredient does not contribute to the total ingredient content, and at least one other ingredient selected from the group consisting of:

| Ingredient | F |
|---|---|
| Acid | 2.0 |
| Emulsion | 2.2 |
| Gelatin Hydrolysate | 1.8 |
| Propylene Glycol | 1.25 |
| Betaine | 0.67 |
| Trehalose | 1.43 |
| Erythritol | 1.43 |
| Sorbitol | 1.43 |
| Isomaltulose | 2.0 |
| Glycerol | 1.25 |
| Maltodextrin | 2.86 | and without a gum;
forming an alcoholic beverage using the alcoholic beverage formulation; and
forming, from the alcoholic beverage, a pourable slush beverage in a freezer, where the freezer falls within the temperature range of −11 to −20° C.

12. A method of formulating an alcoholic beverage for forming a pourable slush over a temperature range between −11 to −20° C., comprising the steps of:

determining an alcohol by volume (ABV) for the beverage and calculating at least a minimum amount of fructose dependent on alcohol content (ABV) according to the equation:

minimum fructose (g/L)=(−14.3×ABV)+331.8; and formulating a substitute formulation by substituting an amount of the fructose with a sugar selected from the group consisting of glucose wherein glucose has an F value of 1.2 and sucrose wherein sucrose has an F value of 1.4, and further wherein the substitute formulation includes an ice nucleator ingredient and other ingredients, measured in g/L, selected from the group consisting of:

| Ingredient | F |
|---|---|
| Acid (e.g. citric or malic) | 2.0 |
| Emulsion | 2.2 |
| Gelatin Hydrolysate | 1.8 |
| Propylene Glycol | 1.25 |
| Betaine | 0.67 |
| Trehalose | 1.43 |
| Erythritol | 1.43 |
| Sorbitol | 1.43 |
| Isomaltulose | 2.0 |
| Glycerol | 1.25 |
| Maltodextrin | 2.86 | and without a gum;
and calculating a contribution of each of the other ingredients and the sugar, but not the ice nucleator ingredient, to a total ingredient content, measured in g/L, wherein the total ingredient content is calculated by adding an amount of each of ingredient in g/L but first dividing the amount of each ingredient in g/L by its F value, wherein said total ingredient content must be above the minimum amount of fructose determined by the equation; and
forming the alcoholic beverage using the substitute formulation for the beverage.

13. A method of using the alcoholic beverage formulation according to claim 6, comprising the step of:
forming, from the alcoholic beverage formulation, a pourable slush beverage in a freezer, where the freezer falls within the temperature range of −11 to −20° C.

14. A method of using the alcoholic beverage formulation according to claim 10 comprising the step of:
forming, from the alcoholic beverage formulation, a pourable slush beverage in a freezer, where the freezer falls within the temperature range of −11 to −20° C.

15. A bottle for use with the alcoholic beverage formulation according to claim 6 comprising:
an opening at least 25 mm wide and comprising annular ribs about its body.

16. A bottle for use with the alcoholic beverage formulation according to claim 10 comprising:
an opening at least 25 mm wide and comprising annular ribs about its body.

17. The alcoholic beverage formulation of claim 6, wherein the ice nucleator ingredient is a plant phytosterol.

18. The method of claim 11 wherein the ice nucleator ingredient is a plant phytosterol.

19. The method of claim 12 wherein the ice nucleator ingredient is a plant phytosterol.

* * * * *